(12) United States Patent
Arlichson

(10) Patent No.: US 9,003,691 B2
(45) Date of Patent: Apr. 14, 2015

(54) ELECTRONIC MOUSE TRAP MODULE

(76) Inventor: Rany Arlichson, Moshav Balt Yehoshua (IL)

( * ) Notice: Subject to any disclaimer, the term of this patent is extended or adjusted under 35 U.S.C. 154(b) by 514 days.

(21) Appl. No.: 13/197,165

(22) Filed: Aug. 3, 2011

(65) Prior Publication Data

US 2013/0031824 A1    Feb. 7, 2013

(51) Int. Cl.
*A01M 23/18* (2006.01)
*A01M 31/00* (2006.01)

(52) U.S. Cl.
CPC .............. *A01M 31/002* (2013.01); *A01M 23/18* (2013.01)

(58) Field of Classification Search
CPC . A01K 1/0613; A01K 1/0245; A01K 1/0017; A01K 1/0236; A01K 15/02; A01K 15/021; A01M 23/18; A01M 23/20; A01M 23/38
USPC ........... 119/751, 718, 719, 720; 43/60, 61, 62
See application file for complete search history.

(56) References Cited

U.S. PATENT DOCUMENTS

| 7,026,942 | B2 | 4/2006 | Cristofori et al. |
| 7,530,195 | B2 | 5/2009 | Muller et al. |
| 7,540,109 | B2 | 6/2009 | Hall |
| 2002/0167409 | A1 | 11/2002 | Cristofori et al. |
| 2004/0020100 | A1* | 2/2004 | O'Brien et al. ................ 43/1 |
| 2009/0313880 | A1 | 12/2009 | Bucher et al. |
| 2010/0050498 | A1 | 3/2010 | Nelson et al. |

FOREIGN PATENT DOCUMENTS

| FR | 2832293 | 5/2003 |
| GB | 2355381 | 1/2011 |
| GB | 2472124 | 1/2011 |
| JP | 2010187622 | 9/2010 |
| WO | WO02/089079 | 10/2004 |
| WO | WO2004/089079 | 10/2004 |
| WO | WO2007/026123 | 3/2007 |

OTHER PUBLICATIONS

International Search Report of PCT Application No. PCT/IB2012/001495 mailed on Jan. 7, 2013.

* cited by examiner

*Primary Examiner* — Rob Swiatek
(74) *Attorney, Agent, or Firm* — Pearl Cohen Zedek Latzer Baratz LLP

(57) ABSTRACT

A controller for a pest trap that includes a sensor, signaler, power source and activator in a housing to be attached to and detached from a pest trap. The sensor detects an animal in the trap and directs an activator to close a door of the trap. A signal is transmitted from the signaler of the housing to indicate that the trap has been activated and the door has been closed. The signal may be collected by a remote receiver. The housing may be detached from the trap and attached to a second trap, or reset on the same trap for reuse.

10 Claims, 3 Drawing Sheets

ELECTRONIC MOUSE TRAP MODULE

BACKGROUND OF THE INVENTION

Traps for animals such as mice, rats, rodents as well as larger and smaller animals may be equipped with various alerts, alarms, sensors and other instruments that may ease trapping pests and dealing with the caught pests. Such equipment may he costly and may add to the expense of pest control on a large scale or over a long term.

SUMMARY OF EMBODIMENTS OF THE INVENTION

Some embodiments of the invention may include a controller for an animal trap, where the controller includes a housing, having in it or attached to it a sensor to detect an to animal; an activator to shut an egress, exit or door of the trap upon a signal from the sensor or on another occurrence or action where an animal is in the trap; a signaler to issue a signal upon the door being shut; a power source to power components of the controller; and an attachment fixture to releasably attach or hold the housing on the trap. In some embodiments, a signal may be sent from a sensor to an activator or to a door of the trap, and such signal may trigger the door to close.

In some embodiments a sensor may include for example an infra-red sensor, an ultrasound sensor, a motion sensor, a heat sensor, and a force sensor, such as a weight sensitive sensor.

In some embodiments, an activator may he or include a spring, a magnet, or a solenoid.

In some embodiments, an attachment or securing mechanism may include a hook, a snap, a screw, a latch, a wire, a string, a VELCRO™ strip or a strap.

In some embodiments, the attachment device may fix the housing in a designated location on the trap so that when the door is in an open position, an extension of the activator engages a door or other shutting device of the trap in an open position.

In some embodiments, the power source may supply power to the sensor, the activator, and the transmitter.

In some embodiments, the attachment mechanism includes two or more members that are at pre-defined distances to each other, and corresponding to a predefined location on the housing relative to the sensor.

In some embodiments, the sensor may be at a predefined location relative to one or more holes in the trap, where the hole is suitable to pass signals, such as visual signals, infra red signals or other data sensed by the sensor.

in some embodiments, the attachment members on the housing correspond to an attachment member on the trap.

In some embodiments, the signaler may be or include a light, a noise maker, or an electromagnetic signal transmitter.

A method in accordance with an embodiment of the invention may include attaching a housing to a first trap, where the housing has a sensor, an activator a signaler and a power source; engaging the activator with a door of the trap; transmitting a signal from the signaler when the trap is to be checked or emptied, or when an animal is caught or is the door is closed; detaching the housing from the first trap; and attaching the housing to a second trap.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
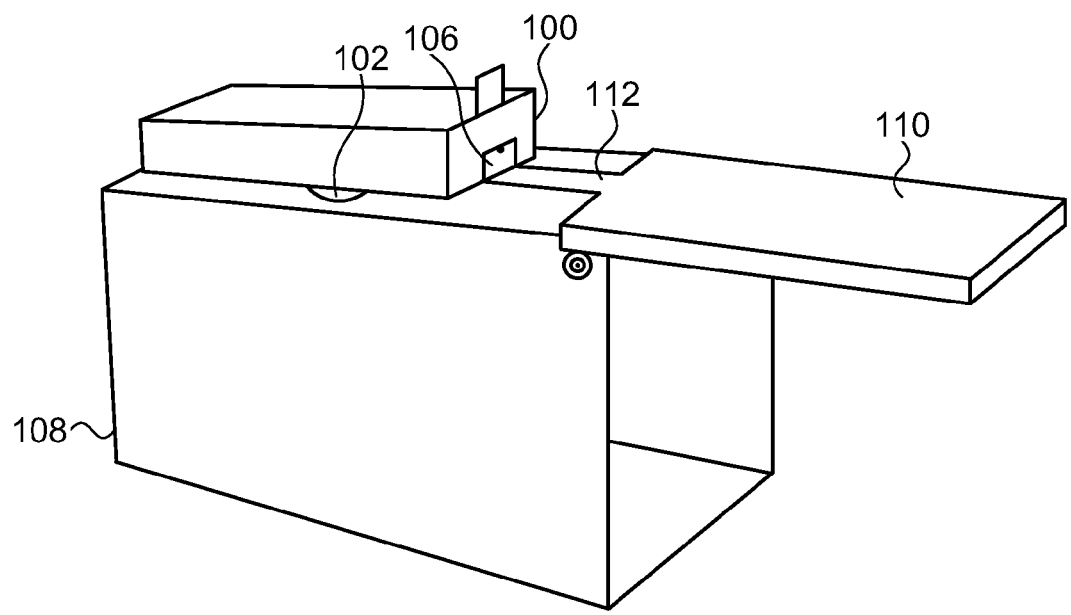
FIG. 1 is a schematic illustration of an animal trap and controller module, according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not is been described in detail so as not to obscure the present invention.

Reference is made to FIG. 1, a controller module attached to a trap in accordance with an embodiment of the invention. Embodiments of the invention may include a controller 100 module housing for an animal or pest trap 108, where such controller 100 is removable and re-useable and may include a sensor 102 to detect a presence of an animal in a trap. Sensor 102 may signal an activator to release a stopper 106 from a door 110 or extension 112 of an egress or door 110 of trap 108 and allow door 110 to shut. In some embodiments, pests may include, rodents, insects, reptiles, mammals or other items to be caught, such as in fishing, hunting or security.

Figure 2:
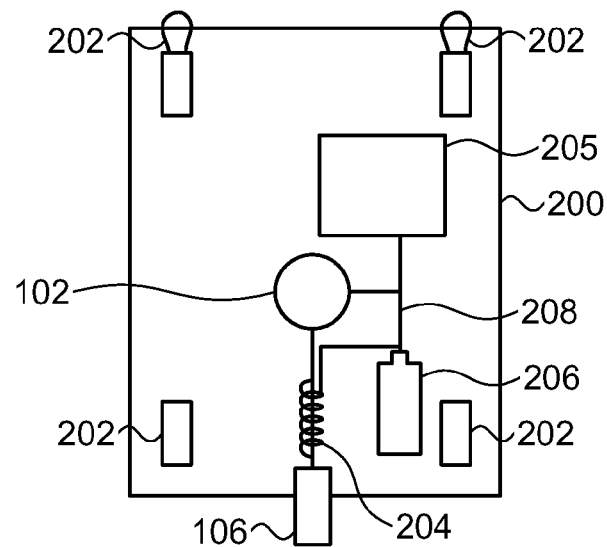
FIG. 2 is a top view schematic illustration of controller module in accordance with an embodiment of the invention.

Reference is made to FIG. 2, an open-top view of a schematic illustration of a controller module in accordance with an embodiment of the invention. Controller 100 may include a housing 200 that may contain or include the components of controller 100. Housing 200 may include or accommodate one or more fasteners 202, by which housing 200 may be removably or releasably attached or held by, secured to or fixed on a top, side or bottom of trap 108. Housing 200 may also include or be connected to a sensor 102 that may detect a presence of an animal in trap 108. Housing 200 may also include activator 204 that may be connected to stopper 106, that when activated and released, may allow door 110 of trap 108 to close. Housing 200 may also include a signal transmitter 205, that may issue a signal, sign or alert when for example activator 204 has been activated to release stopper 106, and/or when door has been shut or closed or an item or animal has been caught or detected. Housing 200 may also include a power source 206 and circuitry 208 to connect and control its various components.

In operation, controller 100 may be removably or releasably attached to trap 108. An extension 112 or member of door 110 may be fitted under stopper 106 to keep door 110 open until for example an animal enters trap 108. A sensor 102 in controller 100 may detect that an animal has entered trap 108, and may generate a signal to activate activator 204 and may release stopper 106 to close door 110 or remove an impediment to allow door 110 to close. Transmitter 205 may be activated to issue a signal that an animal has been detected or caught, and/or that door 110 has been closed. Once an animal has been caught, or trap 108 is otherwise used, housing 200 or controller 100 may be reset by replacing extension 112 under stopper 106, and resetting sensor 102 and activator 106, Alternatively, housing 200 may be removed or detached from trap 108 and attached to another trap for re-use.

In some embodiments, housing 200 may be formed in a standardized shape and size so that housing 200 may be used with a range of sizes of traps 108. For example, a bracket or other space or position of fasteners 202 may be located at a pre-defined distance from an end of extension 112, so that when housing 200 is attached to trap 108 at the designated location and position, stopper 106 may be in a position and location to be engaged with extension 112 regardless of the size of trap 108.

In some embodiments, fasteners 202, may be or include pegs, screws, clasps, snaps, straps, flanges, or other fasteners by which housing may be removeably or releasably held by or secured to or fixed on a side of trap 108. In some embodiments, fasteners 202 may be positioned on a side of trap 108, as for example a peg, screw or other protrusion or male member, and housing 200 may be fitted with an opening, bolt or female member.

In some embodiments, sensor 102 may be or include one or more of a motion sensor, a heat sensor, a weight or force sensor, a movement sensor, an infra-red sensor, a camera, or other sensor suitable for detecting a presence of a pest or animal to be trapped. In some embodiments, one or more sensors 102 may be connected or associated with an activator or bait holder, that may move, jiggle or shake a bait inside or near trap 108 once a pest or animal is detected, to further lure the animal into trap 108. In some embodiments, sensor 102 may be silent or dormant until for example an animal or pest is detected by sensor 102. Upon such detection, sensor 102 may wake up or activate one or more of the components of controller 100 such as for example, activator 106, the transmitter 205 or others, thereby conserving power from power source 206 until an action of such components is needed.

In some embodiments, sensor 102 may be extendible or retractable from housing 200 to outside of housing 200. For example, sensor 102 may be attached to a retractable wire that may emerge from housing 200, so that sensor 102 may be lowered into or onto an outside of trap 108.

In some embodiments, sensor 102 may be fitted onto for example a bottom of housing 200 so that, when housing 200 is properly fitted, onto trap 108, an end or sensing portion of sensor 102 may point or protrude into trap 108 to maximize or widen a view or exposure of a sensing end of sensor 102 into trap 108. In some embodiments, an area of trap 108 corresponding to a location of sensor 102 may include a hole or aperture into which sensor 102 may be fitted or threaded.

In some embodiments, transmitter 205 or a device enabling a transmission of a. signal, such as a signaler, may be or include a wireless transmitter such as a cellular, radio-frequency, infrared, or other transmitter based on electromagnetic frequencies. In some embodiments, transmitter 205 may be or include a light beacon, a flag or other signal suitable to provide a signal that a pest has been caught or that door 110 has been closed. In some embodiments, transmitter 205 may transmit a sound., alarm or other audible signal to indicate that door 110 has been closed. Transmitter 205 may be or include a short distance transmitter or wiring that may transmit a signal to a concentrator that may be fitted on or near one of a group of traps 108, and such concentrator may collect signals from the group of traps, and transmit the collected signals over a longer distance, such as by cellular network.

In some embodiments, power source 206 may be or include a battery, such as a rechargeable battery or other electric connection. In some embodiments, housing 200 may include a solar panel that may collect power in sunlight to charge power source 206.

In some embodiments, activator 204 may be or include a solenoid, one or more electro magnets, a pulley, a rope, a wire, piezoelectric material or other device that may expand, contract or otherwise move upon a charge or receiving a signal from a component of controller 100, so that stopper 106 moves out of a way or frees extension 112. In some embodiments, activator 204 may act on a spring that may close door 110 or allow door 110 to snap shut.

Figure 3:
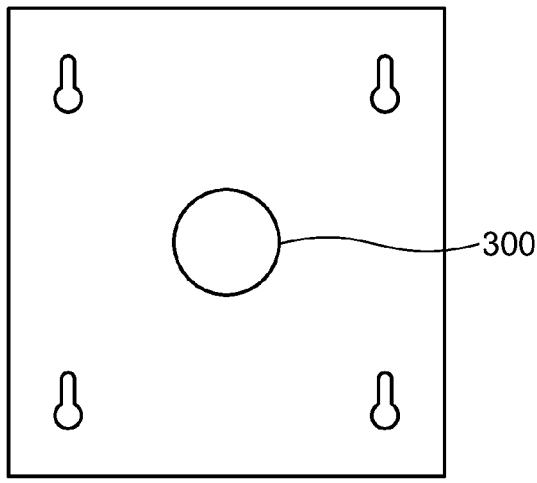
FIG. 3 is a view of a bottom of a controller module in accordance with an embodiment of the invention.

Reference is made to FIG. 3, a bottom view of a housing in accordance with an embodiment of the invention. In some embodiments, a sensing end of sensor 300 may protrude or be directed or pointed from a bottom of housing 200 into or towards an inside of trap 108. For example, a camera, infrared sensor or other sensor 300 may be positioned on housing 200 so that when housing 200 is fitted onto trap 108, an end or sensing portion of sensor 300 fits or points into a cavity of trap 108. Sensor 300 may be pulled or extended from housing 200 so that it hangs or is otherwise suspended within a cavity of trap 108.

Figure 4:
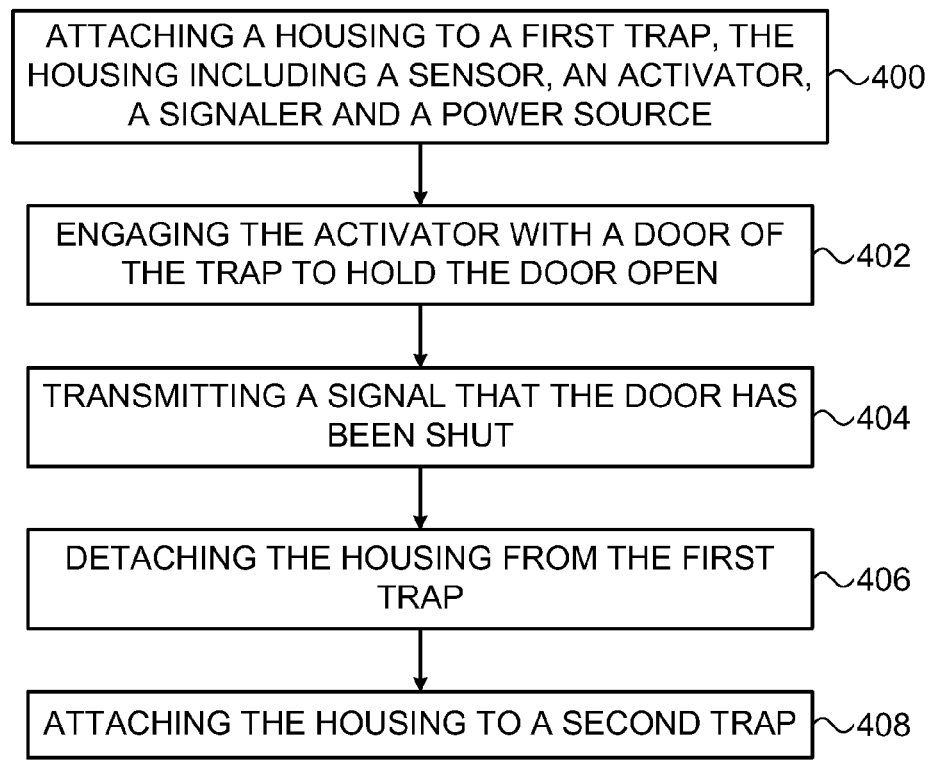
FIG. 4 is a flow diagram of a method in accordance with an embodiment of the invention.

Reference is made to FIG. 4, a flow diagram of a method in accordance with an embodiment of the invention. As is shown in block 400, embodiments of the invention may include attaching a housing to a first trap, where the housing includes a sensor, an activator a signaler and a power source. In block 402, a method may proceed to engaging the activator with a door of the trap so that the door is held in an open position. In block 404, the signaler may transmit a signal to indicate for example that a door of the trap has been shut, that an animal has been detected in the trap, or that otherwise indicates that the trap needs to be checked. In block 406, a method may proceed to detaching the housing from the first trap to which it was attached, and in block 408 the method may proceed to attaching the housing to a second trap or a different type or size of trap.

In some embodiments, a method may include extending the sensor from the housing into a cavity of the trap.

In some embodiments, a method may include transmitting a signal from a housing over a wireless network.

In some embodiments, the attaching of the housing may include engaging a member such as a stopper of the housing with a member on the trap at a predefined location on the trap, so that when the housing is attached to the trap, the member of the housing that is retractable by the activator, is in a position to hold an extension of the door of the trap in an open position.

In some embodiments, a method may include re-engaging the activator with a door of said second trap.

Figure 5:
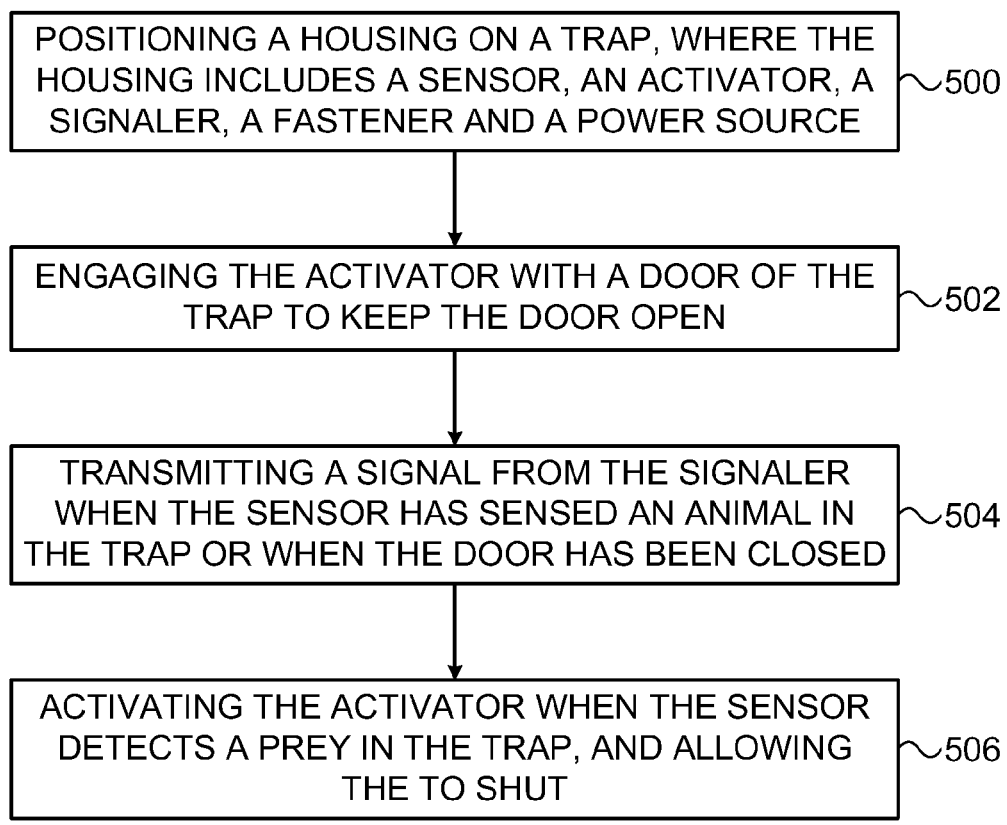
FIG. 5 is a flow diagram of a method in accordance with an embodiment of the invention.

Reference is made to FIG. 5 a flow diagram of a method in accordance with an embodiment of the invention. As is shown in block 500, a method may include positioning a housing on a trap, where the housing includes a sensor, an activator, a signaler, a fastener and a power source. In block 502, the activator may be engaged with a door of the trap to keep the door open. In block 504, a signal may be transmitted from the signaler when the sensor has sensed an animal or prey in the trap or when the door has been closed or shut, or when the activator has been activated. In block 506, the activator may be activated when the sensor detects a prey in the trap and the activation may release the door and allow it to shut.

In some embodiments the transmitter may send a signal over a wireless network.

In some embodiments, the positioning may include engaging a fastening member on the housing with a member on the trap at a predefined location on the trap.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A controller for an animal trap, said controller comprising:
    a housing, said housing including:
        a sensor to detect an animal;
        an activator to shut an egress of said trap upon a signal from said sensor;
        a signaler to issue a signal upon said shutting;
        a power source to power said controller and said sensor; and
        at least one fastener to releasably attach said housing to said trap, wherein all of said sensor, said activator, said signaler, said power source and said at least one fastener are in or attached to said housing.

2. The controller as in claim 1, wherein said sensor is selected from the group consisting of an infra-red sensor, an ultrasound sensor, a motion sensor, a heat sensor, and a force sensor.

3. The controller as in claim 1, wherein said activator is selected from the group consisting of a spring, a magnet, and a solenoid.

4. The controller as in claim 1, wherein said at least one fastener is selected from the group consisting of a hook and loop fastener, a snap, a screw, a latch, a wire, a string, and a strap.

5. The controller as in claim 1, wherein said at least one fastener is to attach said housing to said trap in a location on said trap wherein when said egress is in an open position, an extension of said activator engages a shutting device of said egress.

6. The controller as in claim 1, wherein said power source supplies power to said sensor, said activator, and said transmitter.

7. The controller as in claim 1, wherein said at least one fastener comprises a plurality of members, each of said members is at a pre-defined distance to each other of said members, and at a predefined location relative to said sensor.

8. The controller as in claim 7, wherein said sensor is at a predefined location relative to a hole in said trap, said hole suitable to pass data sensed by said sensor.

9. The controller as in claim 7, wherein each of said members corresponds to a member on said trap.

10. The controller as in claim 1, wherein said signaler is selected from a group consisting of a light, a noise maker or an electromagnetic signal transmitter.

\* \* \* \* \*